US008464006B2

(12) United States Patent
Kwon et al.

(10) Patent No.: US 8,464,006 B2
(45) Date of Patent: Jun. 11, 2013

(54) METHOD AND APPARATUS FOR DATA TRANSMISSION BETWEEN PROCESSORS USING MEMORY REMAPPING

(75) Inventors: Young-Su Kwon, Daejeon (KR); Hyuk Kim, Daejeon (KR); Young-Seok Baek, Daejeon (KR); Suk Ho Lee, Daejeon (KR); Bon Tae Koo, Daejeon (KR); Nak Woong Eum, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1093 days.

(21) Appl. No.: 12/027,364

(22) Filed: Feb. 7, 2008

(65) Prior Publication Data

US 2008/0270711 A1      Oct. 30, 2008

(30) Foreign Application Priority Data

Apr. 30, 2007   (KR) ................. 10-2007-0042189

(51) Int. Cl.
*G06F 13/00*   (2006.01)
*G06F 13/28*   (2006.01)

(52) U.S. Cl.
USPC ............... 711/148; 711/154; 711/E12.038

(58) Field of Classification Search
USPC .................. 711/147, 165, E12.066
See application file for complete search history.

(56) References Cited

U.S. PATENT DOCUMENTS

| | | | | |
|---|---|---|---|---|
| 5,404,478 | A * | 4/1995 | Arai et al. | 711/206 |
| 6,345,351 | B1 * | 2/2002 | Holmberg | 711/203 |
| 6,393,498 | B1 * | 5/2002 | Hou et al. | 710/1 |
| 6,490,250 | B1 * | 12/2002 | Hinchley et al. | 370/232 |
| 6,570,872 | B1 * | 5/2003 | Beshai et al. | 370/369 |
| 2003/0061297 | A1 * | 3/2003 | Fujimoto | 709/213 |
| 2005/0114855 | A1 * | 5/2005 | Baumberger | 718/1 |
| 2005/0246502 | A1 | 11/2005 | Joshi et al. | |
| 2006/0129741 | A1 | 6/2006 | Hillier, III et al. | |
| 2006/0161719 | A1 | 7/2006 | Bennett et al. | |
| 2006/0267990 | A1 | 11/2006 | Rogers et al. | |

* cited by examiner

FOREIGN PATENT DOCUMENTS

| | | |
|---|---|---|
| JP | 2001357022 | 12/2001 |
| KR | 1019980027373 | 7/1998 |
| KR | 100243185 | 11/1999 |
| KR | 1020060033814 | 4/2006 |

OTHER PUBLICATIONS

Shin-Yuan Tzou and David P. Anderson; "The Performance of Message-passing using Restricted Virtual Memory Remapping"; 1991 by John Wiley & Sons, Ltd.; Software-Practice and Experience, vol. 21(3), pp. 251-267 (Mar. 1991).*

*Primary Examiner* — Reginald Bragdon
*Assistant Examiner* — Eric S Cardwell
(74) *Attorney, Agent, or Firm* — Kile Park Reed & Houtteman PLLC

(57) ABSTRACT

Provided are a method and apparatus for efficiently transferring a massive amount of multimedia data between two processors. The apparatus includes a first local switch, which connects a virtual page of a first processor element to a shared memory page, a second local switch, which connects a virtual page of a second processor element to the shared memory page, a shared page switch, which connects a predetermined shared memory page of a shared physical memory to the first or second local switch, and a switch manager, which remaps a certain shared memory page of the shared physical memory that stores data of a task performed by the first processor element to the virtual page of the second processor element. Accordingly, since memory remapping is used, the massive amount of multimedia data can be transmitted by changing a method of mapping a memory, unlike a case when multimedia data is transmitted by using a memory bus.

11 Claims, 3 Drawing Sheets

METHOD AND APPARATUS FOR DATA TRANSMISSION BETWEEN PROCESSORS USING MEMORY REMAPPING

CROSS-REFERENCE TO RELATED PATENT APPLICATION

This application claims the benefit of Korean Patent Application No. 10-2007-0042189, filed on Apr. 30, 2007, in the Korean Intellectual Property Office, the disclosure of which is incorporated herein in its entirety by reference.

BACKGROUND OF THE INVENTION

1. Field of the Invention

The present invention relates to a method and apparatus for data transmission between processors, and more particularly, to a method and apparatus for efficiently transferring a massive amount of multimedia data between two processors, when there are at least two processors that process multimedia data.

This work was supported by the IT R&D program of MIC/IITA. [2006-S-048-01, Embedded DSP Platform for Audio/Video Signal Processing]

2. Description of the Related Art

With the development of information technology (IT) industries, not only portable products, but also residential electronic products, which can process multimedia data, such as video and audio, have remarkably increased. The use of such multimedia products is expanding in various product groups, such as DVD technology, MPEG-2 technology, moving image reproduction functions of mobile phones, HDTVs, etc. An image or audio for a corresponding multimedia product includes a massive amount of data from a raw data point of view. For example, when each pixel of an image having a screen size of 1920×1200 is expressed in 24-bit, transmission performance of 1.66 Gbps is required in order to transmit 30 frames per second in a continuous serial bitstream. As the frame rate increases, better transmission performance is required, and thus most images and sounds use an advanced compression technology.

Various compression technologies of multimedia data exist, including MPEG-2, MPEG-4, H.264, bit sliced arithmetic coding (BSAC), advanced audio coding plus (AAC+), etc. Hardware having a function of coding and decoding an image is required so as enable the use of such compression technologies. Most mobile and residential multimedia devices include very large scale integration (VLSI) for a multimedia codec in order to perform coding and decoding in real time.

Performance of VLSI for a codec differs according to the complexity or characteristics of a codec algorithm. Recent multimedia codecs require a data processing performance from 0.6 giga instructions per second (GIPS) to 1.5 GIPS, and several years from now, it is predicted that multimedia codecs will require a data processing performance from 2 GIPS to 5 GIPS. Accordingly, a high performance chip for codecs is required.

A codec chip can be realized in a processor or an application specific integrated circuit (ASIC).

In case of a processor, when a new codec is used, the processor can realize the new codec in a short time, and even when the processor is manufactured in VLSI, the processor has a flexibility to re-realize another new codec in a short time. However, the speed of processing data is low.

In the case of an ASIC, the speed of processing data is high, but it takes a long time, up to several months, to realize a new codec in a real ASIC. When ASIC is realized in VLSI with regards to a certain codec, when a new codec is used, a new codec chip should be manufactured.

In order to complement the low speed of a processor, a plurality of processors is realized in one VLSI. While processing multimedia data, the same operation is repeatedly performed on a series of data streams, and thus a VLSI structure for processing data can be in parallel. When the VLSI structure is in parallel, tasks for processing data can be independently assigned to each processor, and the assigned tasks can be simultaneously performed. Accordingly, unlike a general purpose processor that processes general data, processors in parallel can process multimedia data. Such processors in parallel maintain the intrinsic advantages of a processor, such as short development time and flexibility, while showing high performance. Processors in parallel that have a suitable structure for processing streams are referred to as a stream processor. Also, each processor in a stream processor is referred to as a processor element.

The most important issue in a stream processor is the transferal of data between processor elements. As described above, multimedia data is a flow of a massive amount of data that requires repetitive operations. In order to transfer data between a plurality of processor elements in the stream processor, a communication bandwidth should be maximized.

A bus structure is used to transfer data between two processor elements. The bus structure includes a series of wires and a protocol to control the transfer of data between the wires, and thus stream data is continuously transmitted during each clock cycle. Examples of the bus structure include advanced microcontroller bus architecture (AMBA), Core-Connect, peripheral component interconnect (PCI), and PCI extended (PCI-X).

However, due to a basic characteristic of the bus structure, a transmission bandwidth is limited while transmitting data between processor elements in the stream processor, and thus the stream processor is not suitable for transmitting a massive amount of multimedia data.

Accordingly, a method of quickly transmitting a massive amount of multimedia data between two predetermined processor elements is required.

SUMMARY OF THE INVENTION

The present invention provides a method and apparatus for quickly transmitting a massive amount of multimedia data between two predetermined processor elements in a stream processor, while each processor element is performing independent tasks.

The present invention also provides a multiprocessor system including an apparatus for quickly transmitting a massive amount of multimedia data between two processor elements.

According to an aspect of the present invention, there is provided an apparatus for performing data transmission between processors using memory remapping in a multiprocessor system including a plurality of processor elements, the apparatus including: a first local switch, which connects a virtual page of a first processor element to a shared memory page of a shared physical memory that is shared by the first processor element and a second processor element; a second local switch, which connects a virtual page of the second processor element to the shared memory page of the shared physical memory; a shared page switch, which connects the shared memory page of the shared physical memory to the first local switch or the second local switch; and a switch manager, which remaps a certain shared memory page of the shared physical memory storing data of a task performed by the first processor element to the virtual page of the second processor element and remaps a idle shared memory page of the shared physical memory to the virtual page of the first processor element by controlling the first local switch, the second local switch, and the shared page switch, when tasks performed by the first and second processor elements are completed.

The first processor element and the second processor element may be processor elements of a stream processor for processing a multimedia data stream.

The switch manager may include: a task synchronizer, which synchronizes the tasks by determining whether the tasks that are performed by the first and second processor elements are completed; and a switch controller, which controls the first local switch, the second local switch, and the shared page switch. The task synchronizer may transmit a control start instruction to the switch controller based on a time of receiving task completion notification from both first and second processor elements.

The switch manager may remap a shared memory page, which is in an idle state after being mapped to the virtual page of the second processor element and then unmapped, to the virtual page of the first processor element.

According to another aspect of the present invention, there is provided a method of performing data transmission between processors using memory remapping in a multiprocessor system including a plurality of processor elements, the method including: storing first data, which is obtained by a first processor element performing a first task, in a certain shared memory page, which is mapped to a virtual page of the first processor element, of a shared physical memory that is shared by the first processor element and a second processor element; when tasks that are being performed by the first and second processor elements are completed, remapping the certain shared memory page storing the first data to a virtual page of the second processor element, and remapping a idle shared memory page of the shared physical memory to the virtual page of the first processor element; and obtaining second data by the second processor element performing a second task based on the first data stored in the certain shared memory page.

The first processor element and the second processor element may be processor elements of a stream processor for processing a multimedia data stream.

The method may further include synchronizing the tasks by determining whether the tasks that are performed by the first and second processor elements are completed. The synchronizing of the tasks may include transmitting a control start instruction for memory remapping based on a time of receiving task completion notifications from both first and second processor elements.

The remapping may remap a shared memory page, which is in an idle state after being mapped to the virtual page of the second processor element and then unmapped, to the virtual page of the first processor element.

Briefly describing the present invention, when a massive amount of multimedia data is to be transmitted between two predetermined processor elements in a stream processor including a plurality of processor elements, a processor can use corresponding data by remapping a memory that was being used by another processor. Specifically, data is transmitted between processors by performing memory remapping at a time of task synchronization while each processor is performing an assigned task.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
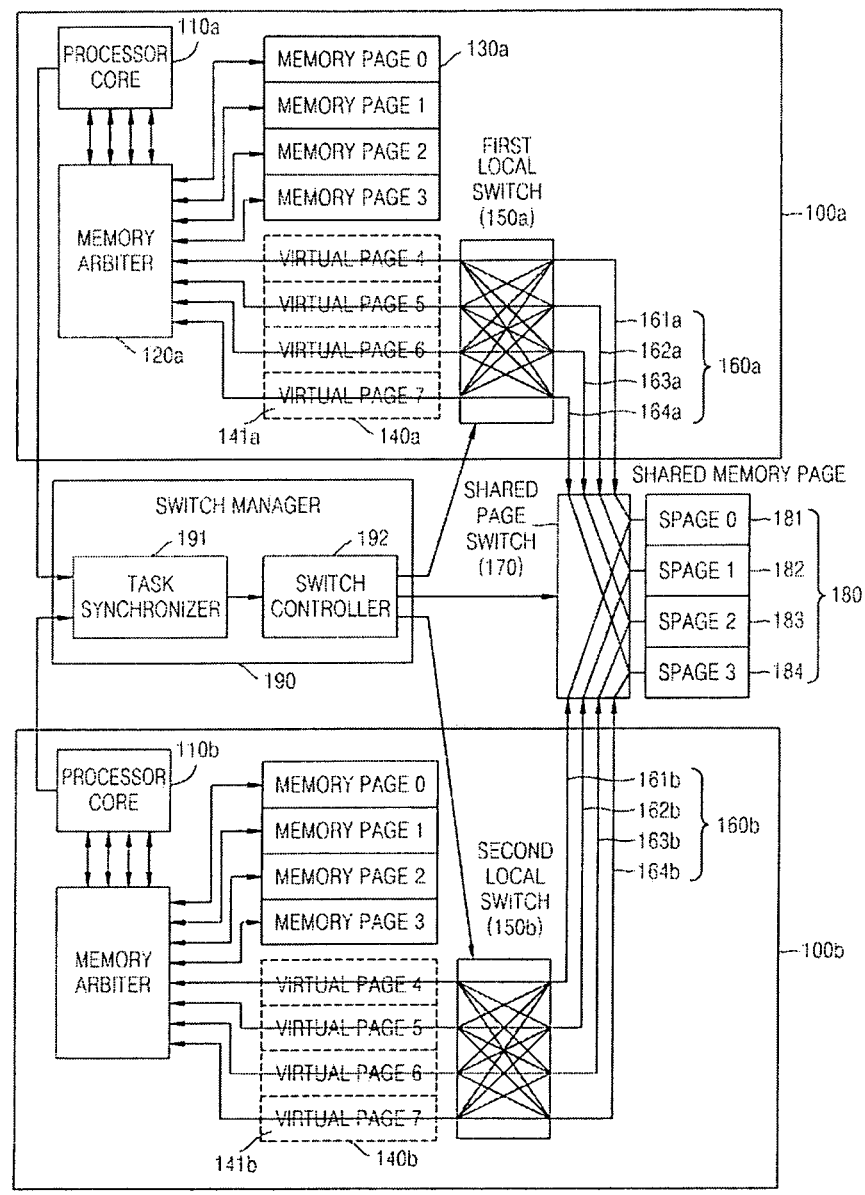
FIG. 1 is a diagram illustrating an apparatus for data transmission between processors using memory remapping according to an embodiment of the present invention.

Hereinafter, the present invention will be described more fully with reference to the accompanying drawings, in which exemplary embodiments of the invention are shown. In the drawings, like reference numerals denote like elements. Also, while describing the present invention, detailed descriptions about related well-known functions or configurations that may diminish the clarity of the points of the present invention are omitted.

FIG. 1 is a diagram illustrating an apparatus for data transmission between processors using memory remapping according to an embodiment of the present invention. In other words, FIG. 1 illustrates an apparatus for transmitting data between dual processor elements 100a and 110b in a system including the dual processor elements 100a and 100b and a shared physical memory 180.

Referring to FIG. 1, the apparatus according to the current embodiment of the present invention includes a first local switch 150a, a second local switch 150b, a shared page switch 170, and a switch manager 190.

The first local switch 150a connects a virtual memory 140a of the first processor element 100a to predetermined shared memory pages 181 through 184 of the shared physical memory 180. Similarly, the second local switch 150b connects a virtual memory 140b of the second processor element 100b to the predetermined shared memory pages 181 through 184 of the shared physical memory 180.

Preferably, the first processor element 100a and the second processor element 100b are two predetermined processor elements of a stream processor for processing a multimedia data stream.

The shared page switch 170 connects each shared memory page of the shared physical memory 180 to the first or second local switch 150a or 150b.

When tasks that are performed by the first and second processor elements 100a and 100b are completed, the switch manager 190 remaps a certain shared memory page of the shared physical memory 180 storing data of the task performed by the first processor element 100a to a virtual page of the second processor element 100b and remaps a predetermined idle shared memory page of the shared physical memory 180 to a virtual page of the first processor element 100a by controlling the first local switch 150a, the second local switch 150b, and the shared page switch 170. In this case, the switch manager 190 can remap a shared memory page, which is in an idle state after being mapped to a virtual page of the second processor element 100b and then unmapped, of the shared physical memory 180 to a virtual page of the first processor element 100a.

The switch manager 190 may include a task synchronizer 191, which synchronizes the tasks by determining whether the tasks that are performed by the first and second processor elements 100a and 100b are completed, and a switch controller 192, which controls the first local switch 150a, the second local switch 150b and the shared page switch 170. The task synchronizer 191 performs synchronization by transmitting a control start instruction to the switch controller 192 based on a time of receiving task completion notifications from both first and second processor elements 100a and 100b.

In order to describe the above in more detail, it is assumed that the first and second processor elements 100a and 100b perform separate multimedia tasks in a system in which the apparatus of the current embodiment of the present invention is included. In FIG. 1, when a multimedia algorithm performed by the first and second processor elements 100a and 100b is voice modulation MP2 decoding, the first processor element 100a performs a task of decoding MP2 and the second processor element 100b performs a task of modulating decoded voice data.

At this time, the first processor element 100a performs the task of decoding a stream that is encoded as MP2 and then transmits the result of the task to the second processor element 100b. Immediately after transmitting the result, the first processor element 100a continuously decodes streams that are encoded as MP2. Upon receiving decoded voice data from the first processor element 100a, the second processor element 100b performs voice modulation. Since MP2 decoding and voice modulation can be independently performed, the performance of the first and second processor elements 100a and 100b is approximately twice as good compared to a case when the MP2 decoding and voice modulation are performed in one processor element.

The first processor element 100a includes a processor core 110a, a memory arbiter 120a, a local memory 130a, the virtual memory 140a, and the first local switch 150a.

The processor core 110a is a digital signal processor (DSP). The processor core 110a requests four memory accesses to the memory arbiter 120a at each clock cycle in order to read an instruction and an operand required in calculation and store results of reading an instruction and an operand in a memory. The memory arbiter 120a connects the four memory accesses to an actual memory page. Here, it is well known to ordinary skill in the art that the number of memory accesses can be increased or decreased according to the system.

In the current embodiment of the present invention, four memory pages exist in each of the local memory 130a and the virtual memory 140a, and thus the total number of memory pages is eight. Since the number of memory accesses required by the processor core 110a is four, the memory arbiter 120a maps an actual memory page according to each memory access request. The local memory 130a is a memory page that physically exists in a local area of the first processor element 100a. Memory pages of the local memory 130a may store data that independently exists in a processor element, such as an instruction, a stack, or a static variable of the processor core 110a.

Unlike the local memory 130a that physically exists in the first processor element 100a, the virtual memory 140a includes virtual pages. Virtual pages 4 through 7 in the virtual memory 140a do not physically exist in the first processor element 100a, but may correspond to a physical memory outside of the first processor element 100a or may be an virtual area that does not exist physically.

The virtual memory 140a is connected to the shared physical memory 180. In other words, each memory page of the virtual memory 140a is connected to each memory bus 161a through 164a of an external memory bus 160a that is connected to the outside of the first processor element 100a through the first local switch 150a. Then, each memory page is connected to any one of the shared memory pages 181 through 184 of the shared physical memory 180 through the shared page switch 170.

The first local switch 150a connects the virtual memory 140a to a predetermined memory bus 161a through 164a of the external memory bus 160a. Substantially, the memory arbiter 120 connects a memory bus that is determined to include a memory, i.e. a memory bus between the memory arbiter 120a and the virtual memory 140a to the external memory bus 160a. Mapping of the virtual memory 140a and the external memory bus 160a is determined by the switch controller 192.

The external memory bus 160a of the first processor element 100a and an external memory bus 160b of the second processor element 100b are connected to the shared page switch 170. The shared page switch 170 connects a memory bus selected from among the memory bus 161a through 164a and memory bus 161b through 164b to each of the shared memory page 181 through 184 of the shared physical memory 180. In other words, the shared page switch 170 connects a memory bus selected from among the memory buses 161a and 161b to a shared memory page 0 181, a memory bus selected from among the memory buses 162a and 162b to a shared memory page 1 182, a memory bus selected from among the memory buses 163a and 163b to a shared memory page 2 183, and a memory bus selected from among the memory buses 164a and 164b to a shared memory page 3 184. Here, the switch controller 192 selects a memory bus that is to be connected to a shared memory page.

While performing the corresponding tasks, the processor cores 110a and 110b notify the task synchronizer 191 that the corresponding tasks have reached a synchronization point in a program at a certain point of the tasks. For example, when writing data on a shared memory page is completed while performing the MP2 decoding, the processor core 110a transmits a task completion notification to the task synchronizer 191, and when the voice modulation on voice data stored in the shared memory page is completed, the processor core 110b transmits a task completion notification to the task synchronizer 191. Upon receiving the task completion notifications from both processor cores 110a and 110b, the task synchronizer 191 transmits a control start instruction to the switch controller 192 so as to change each switch configuration.

Upon receiving the control start instruction from the task synchronizer 191, the switch controller 192 changes switch configurations of the first local switch 150a of the first processor element 110a, the second local switch 150b of the second processor element 100b, and the shared page switch 170. As such, by re-setting a method of connecting each switch, the shared physical memory 180 is remapped. In other words, whenever the task synchronizer 191 transmits a control start instruction to the switch controller 192, each of the shared memory pages 181 through 184 are remapped to a selected virtual memory of the first and second processor element 100a and 100b, and thus data can be transferred between the first and second processor elements 100a and 100b.

Accordingly, by using the memory remapping, a massive amount of data can be transmitted by only changing a method of mapping a memory, unlike when the data is transmitted by using a memory bus. Thus, a limitation in terms of bandwidth can be removed.

In the above description, the number of virtual pages and the number of memory buses that connect the virtual memory 140a and the shared physical memory 180 each equal four in each of the first and second processor elements 100a and 100b, but it is well known to those of ordinary skill in the art that the numbers can increase or decrease according to the system.

Also, the result of performing the task of the first processor element 100a is used by the second processor element 100b, but the apparatus according to the current embodiment of the present invention can be applied to a case when the result of performing the task of the second processor element 100b is used by the first processor element 100a.

Figure 2:
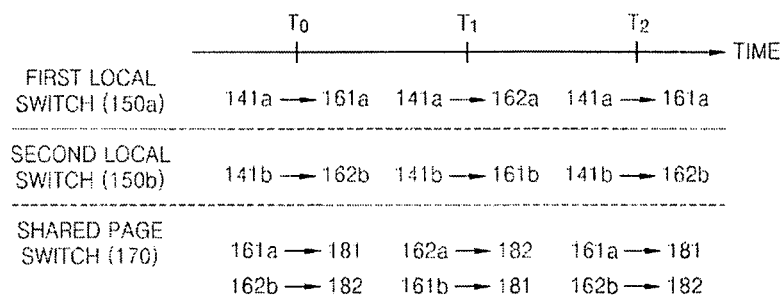
FIG. 2 is a diagram illustrating a connection status between switches and a shared memory during memory remapping in the apparatus of FIG. 1.

FIG. 2 is a diagram illustrating a connection status between switches and the shared physical memory 180 during memory remapping in the apparatus of FIG. 1. FIG. 2 is described with reference to FIG. 1.

In FIG. 2, the horizontal axis denotes time. In the current embodiment, the first processor element 100a performs MP2 decoding and the second processor element 100b performs voice modulation.

At time $T_0$, the first processor element 100a connects a virtual page 7 141a of the virtual memory 140a to the memory bus 161a through the first local switch 150a. At this time, the processor core 110b of the second processor element 100b is in an idle state. The shared page switch 170 connects the memory bus 161a to the shared memory page 181.

Between time $T_0$ and time $T_1$, the first processor element 100a performs the MP2 decoding and stores decoded data in the virtual page 7 141a. Consequently, the decoded data is stored in the shared memory page 0 181.

At time $T_1$, the first local switch 150a connects the virtual page 7 141a to the memory bus 162a. The second local switch 150b connects a virtual page 7 141b of the second processor element 100b to the memory bus 161b. The shared page switch 170 connects the memory bus 162a to the shared memory page 1 182, and simultaneously connects the memory bus 161b to the shared memory page 0 181. By performing such memory remapping, data decoded by the first processor element 100a can be used by the second processor element 100b without a separate data transmission process.

Between time $T_1$ and time $T_2$, the second processor element 100b performs voice modulation on decoded voice data stored in the shared memory page 0 181. Simultaneously, the first processor element 100a decodes continuously received MP2 streams, and stores decoded voices in the shared memory page 1 182.

When the above tasks are completed, the first local switch 150a connects the virtual page 7 141a to the memory bus 161a at time $T_2$. The second local switch 150b connects the virtual page 7 141b of the second processor element 100b to the memory bus 162b. The shared page switch 170 connects the memory bus 161a to the shared memory page 0 181, and simultaneously connects the memory bus 162b to the shared memory page 1 182.

After time $T_2$, the virtual page 7 141b of the second processor element 100b is stored in the shared memory page 1 182, and the second processor element 100b performs voice modulation on voice decoded by the first processor element 100a immediately before the virtual page 7 141b is stored in the shared memory page 1 182.

As described above, the data decoded by the first processor element 100a is very quickly transmitted to the second processor element 100b.

By performing the above processes, a massive amount of data can be transferred, without any separate data transmission process between each processor element, by performing memory remapping until the tasks are finally completed. Also, independent tasks can be performed by using the memory remapping, without changing a program performed by a processor core of each processor element.

Figure 3:
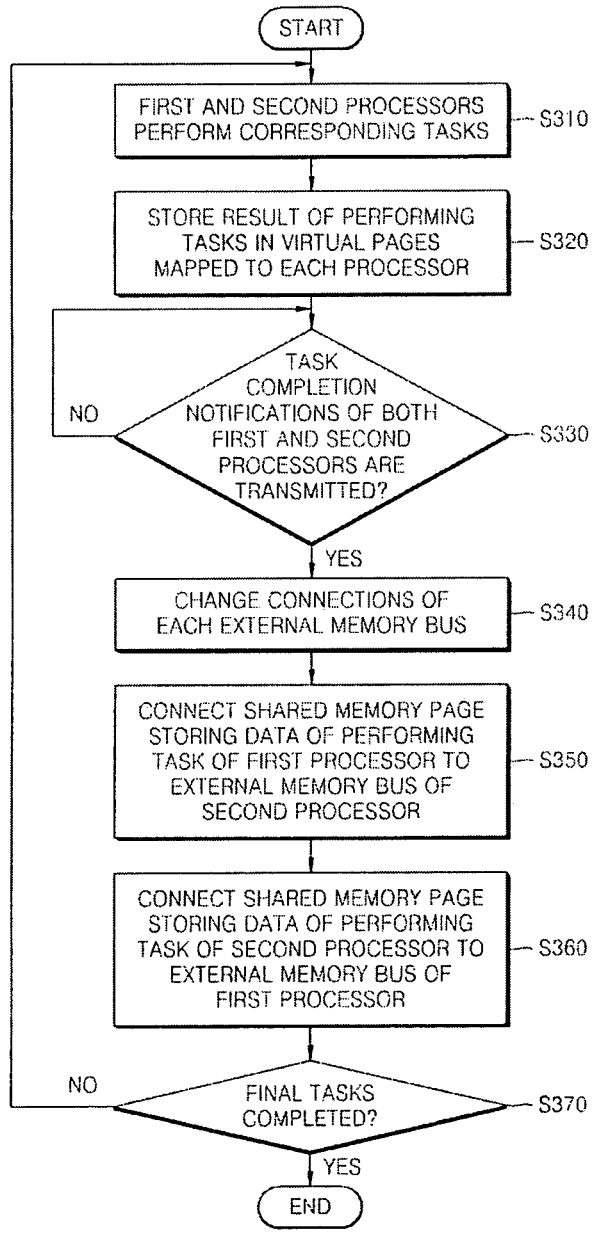
FIG. 3 is a flowchart illustrating a method for data transmission between processors according to an embodiment of the present invention.

FIG. 3 is a flowchart illustrating a method for data transmission between processors according to an embodiment of the present invention. FIG. 3 will be described with reference to FIG. 1, and descriptions overlapping with FIG. 1 will be omitted.

Referring to FIG. 3, each of the first processor element 100a and the second processor element 100b performs corresponding tasks in operation S310. When first data is obtained by the first processor element 100a performing a first task, the first data is stored in a pre-mapped virtual page, and thus the first data is stored in a certain shared memory page connected to the pre-mapped virtual page in operation S320.

The tasks are synchronized in operation S330 by determining whether the tasks performed by the first and second processor elements 100a and 100b are completed. Preferably, a control start instruction for memory remapping is transmitted based on a time of receiving task completion notifications from both first and second processor elements 100a and 100b.

In operation S340, connections of each external memory bus to the shared physical memory 180 are changed, and in operation S350, when the tasks that was being performed by the first and second processor elements 100a and 100b are completed, a certain shared memory page storing the first data is remapped to a virtual page of the second processor element 100b. Also, in operation S360, a predetermined idle shared memory page of the shared physical memory 180 is remapped to a virtual page of the first processor element 100a. Preferably, the shared memory pages can be rotationally used by remapping a shared memory page of the shared physical memory 180, which is in an idle state after being mapped to the virtual page of the second processor element 100b and then unmapped, to the virtual page of the first processor element 100a in operation S360.

By performing the above processes, the second processor element 100b can use the first data stored in the certain memory page without any separate transmission process, and accordingly, the second processor element 100b obtains second data by performing a second task based on the first data.

The first and second processor elements 100a and 100b perform the memory remapping as described above until the final tasks are completed in operation S370.

In the above description, the second processor element 100b uses the result of performing the task of the first processor element 100a, but the method according to the current embodiment of the present invention can be applied to a case when the first processor element 100a uses the result of performing the task of the second processor element 100b.

It will be obvious to one of ordinary skill in the art that the method can be applied not only to an apparatus for data transmission, but also to a multiprocessor system, which is realized to quickly transmit a massive amount of data between two processors and includes the apparatus.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

According to the present invention, a massive amount of data can be transmitted by only changing a method of mapping a memory, unlike a case when data is transmitted by using a memory bus, since memory remapping is used.

Also, a limitation in terms of bandwidth in a memory bus connecting two processors can be removed.

In addition, since a massive amount of data can be quickly transferred between two predetermined processors, a high performance multiprocessor system can be realized.

While this invention has been particularly shown and described with reference to preferred embodiments thereof, it will be understood by those of ordinary skill in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims and all differences within the scope will be construed as being included in the present invention.

What is claimed is:

1. An apparatus for performing data transmission between processors using memory remapping in a multiprocessor system including a plurality of processor elements, the apparatus comprising:
    a first local switch of a first processor element having a control input coupled to a switch manager to receive control instructions from the switch manager to selectively connect a virtual page of the first processor element to a shared memory page of a shared physical memory that is shared by the first processor element and a second processor element;
    a second local switch of the second processor element having a control input coupled to the switch manager to receive control instructions from the switch manager to selectively connect a virtual page of the second processor element to the shared memory page of the shared physical memory;
    a shared page switch having a control input coupled to the switch manager to receive control instructions from the switch manager to selectively connect the shared memory page of the shared physical memory to the first local switch or the second local switch; and
    the switch manager selectively transmitting control instructions to the control inputs of the first local switch, the second local switch, and the shared page switch to remap a certain shared memory page of the shared physical memory storing data of a task performed by the first processor element to the virtual page of the second processor element and to remap an idle shared memory page of the shared physical memory to the virtual page of the first processor element, when the task performed by the first processor element and a task performed by the second processor element are completed.

2. The apparatus of claim 1, wherein the first processor element and the second processor element are processor elements of a stream processor for processing a multimedia data stream.

3. The apparatus of claim 1, wherein the switch manager comprises:
    a task synchronizer, which synchronizes the tasks by determining whether the tasks that are performed by the first and second processor elements are completed; and
    a switch controller, which controls the first local switch, the second local switch, and the shared page switch.

4. The apparatus of claim 3, wherein the task synchronizer transmits a control start instruction to the switch controller based on a time of receiving task completion notification from both first and second processor elements.

5. The apparatus of claim 1, wherein the switch manager remaps a shared memory page, which is in an idle state after being mapped to the virtual page of the second processor element and then unmapped, to the virtual page of the first processor element.

6. A method of performing data transmission between processors using memory remapping in a multiprocessor system including a plurality of processor elements, the method comprising:
    transmitting, from a switch manager to a shared page switch, a first control message to selectively connect a virtual memory page of a first processor element to a first shared memory page of a shared physical memory that is shared by the first processor element and a second processor element;
    connecting, by the shared page switch, the virtual memory page of the first processor element to the first shared memory page of the shared physical memory in response to receiving the first control message;
    storing first data, which is obtained from the first processor element performing a first task, in the first shared memory page, which is connected to the virtual memory page of the first processor element by the shared page switch;
    when the first task performed by the first processor element and a task performed by the second processor element are completed, transmitting, from the switch manager to the shared page switch, a second control message to selectively connect the first shared memory page storing the first data to a virtual memory page of the second processor element, and selectively connect a second shared memory page of the shared physical memory to the virtual memory page of the first processor element;
    connecting, by the shared page switch, the first shared memory page to the virtual memory page of the second processor element, and the second shared memory page to the virtual memory page of the first processor element, in response to receiving the second control message; and
    obtaining second data from the second processor element performing a second task based on the first data stored in the first shared memory page connected to the virtual memory page of the second processor by the shared page switch.

7. The method of claim 6, wherein the first processor element and the second processor element are processor elements of a stream processor for processing a multimedia data stream.

8. The method of claim 6, further comprising synchronizing the tasks by determining whether the tasks that are performed by the first and second processor elements are completed.

9. The method of claim 8, wherein the synchronizing of the tasks comprises transmitting a control start instruction for memory remapping based on a time of receiving task completion notifications from both first and second processor elements.

10. The method of claim 6, wherein the remapping remaps a shared memory page, which is in an idle state after being mapped to the virtual page of the second processor element and then unmapped, to the virtual page of the first processor element.

11. The method of claim 6, wherein the shared page switch is operative to connect each of the first and second shared memory pages of the shared physical memory to a virtual memory page of either the first or the second processor element.

* * * * *